United States Patent
Han

(10) Patent No.: US 6,956,561 B2
(45) Date of Patent: Oct. 18, 2005

(54) KEYPAD BACKLIGHTING OF MOBILE TERMINAL

(75) Inventor: Sang-Ho Han, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 247 days.

(21) Appl. No.: 10/207,051

(22) Filed: Jul. 30, 2002

(65) Prior Publication Data

US 2003/0043120 A1 Mar. 6, 2003

(30) Foreign Application Priority Data

Sep. 4, 2001 (KR) .......................................... 2001-54194

(51) Int. Cl.[7] .............................................. G09G 5/00
(52) U.S. Cl. ........................ 345/170; 345/173; 345/102; 178/18.11; 200/5 A; 200/314; 200/317; 40/542; 40/544; 340/815.4; 340/815.48; 340/815.49; 340/815.53; 379/368; 313/506; 313/509; 313/511
(58) Field of Search ................................ 345/170–173, 345/102; 362/24; 313/506, 509.5; 178/18.11; 200/5 A, 314; 40/542, 544; 379/368; 340/815.4

(56) References Cited

U.S. PATENT DOCUMENTS

| | | | | |
|---|---|---|---|---|
| 5,175,759 A | * | 12/1992 | Metroka et al. | ......... 455/569.1 |
| 5,669,486 A | * | 9/1997 | Shima | ........................ 200/314 |
| 5,971,557 A | | 10/1999 | Kubes et al. | |
| 6,100,478 A | * | 8/2000 | LaPointe et al. | ............. 200/314 |
| 6,246,169 B1 | * | 6/2001 | Pruvot | ......................... 313/506 |
| 6,670,565 B2 | * | 12/2003 | Hanahara et al. | ........... 200/314 |
| 6,704,004 B1 | * | 3/2004 | Osterg.ang.rd et al. | ..... 345/170 |
| 6,771,256 B1 | * | 8/2004 | Abraham et al. | ........... 345/204 |

FOREIGN PATENT DOCUMENTS

| | | |
|---|---|---|
| CN | 2137006 Y | 6/1993 |
| CN | 2195832 Y | 4/1995 |
| GB | 2 354 738 | 4/2001 |
| JP | 09-093324 | 4/1997 |
| JP | 200-207101 | 7/2000 |
| JP | 2000-285760 | 10/2000 |
| JP | 2001-111687 | 4/2001 |
| WO | 99/18590 | 4/1999 |

OTHER PUBLICATIONS

Chinese Office Action dated Mar. 5, 2004 with English language translation.

* cited by examiner

Primary Examiner—Henry N. Tran
(74) Attorney, Agent, or Firm—Fleshner & Kim, LLP

(57) ABSTRACT

A keypad backlighting apparatus includes an electroluminescence layer for lighting an input device of an electronic apparatus. The input device may be a keypad and the electronic apparatus may be a mobile communications terminal. The terminal includes an upper case having a plurality of button holes formed in a predetermined pattern, electroluminescence (EL) keypad on a lower surface of the upper case and having buttons exposed through the button holes. A printed circuit board (PCB) installed adjacent the EL keypad includes a backlight driving circuit for supplying power to the EL keypad. A lower case of the terminal is coupled to the upper case and supports the EL keypad and the PCB.

21 Claims, 7 Drawing Sheets

KEYPAD BACKLIGHTING OF MOBILE TERMINAL

BACKGROUND OF THE INVENTION

1. Field of the Invention

The present invention relates to a keypad assembly, and more particularly to a keypad assembly in which a whole surface of the keypad is illuminated.

2. Background of the Related Art

Mobile terminals often include a backlighting function which allows buttons on a terminal keypad to be manipulated even under dark or poor lighting conditions. Light emitting diodes (LEDs) are generally used as the light sources for this keypad backlighting function.

FIG. 1 is a side-sectional view of a folder-type mobile terminal which employs a conventional technique for backlighting a keyboard, and FIG. 2 is an enlarged view of a portion 'A' of FIG. 1. As shown in these figures, the mobile terminal includes a main body 10 consisting of upper and lower cases 11 and 12 and a cover 20 connected to the main body 10 by a hinge mechanism 30. The cover includes a display unit 21 for displaying an operation state of the terminal and a message, and a receiving part 22 for outputting a voice.

The upper case 11 of the main body 10 is provided with a plurality of button holes, and a keypad 14 having an equal number of domes 14b fitted on a lower surface of upper case such that the domes 14b protrude through corresponding button holes of the upper case. Each dome 14b is formed to be upwardly raised such that a corresponding button 14c is filled in a lower cavity of the dome.

A PCB 15 is located below the keypad with a certain gap therebetween. The PCB is provided with a plurality of actuators 15a installed just below corresponding buttons 14 so as to generate an electric signal when each button 14 is pressed. Light emitting diodes 15b are arranged between the actuators 15a for backlighting the key pad 14.

FIG. 3 is a circuit diagram of an LED driving circuit of the conventional backlighting apparatus. In this driving circuit, a collector and an emitter of a switch transistor (Q1) are connected when a control voltage of 3.0V is applied to the base terminal, thereby causing the LEDs 15b to emit light. In the conventional backlighting apparatus, about 6 to 12 LEDs, each consuming about 60–120 mA, are used for backlighting the keypad 14.

FIG. 4 is a top plan view of the conventional keypad backlighting apparatus. In this figure, reference numeral 17 denotes an emitting coverage of LEDs 15b. As shown, even though 10 LEDs are disposed around the PCB surface below the keypad for illuminating keypad 14, the illumination coverage is locally limited around the respective LEDs so as not to evenly illuminate the entire keypad.

It is therefore clear that the conventional backlighting apparatus has significant drawbacks. First, in the conventional apparatus the illumination coverage differs depending on the installation positions of the LEDs, and these installation positions fail to allow the entire keypad to be evenly illuminated. Second, 6–12 LEDs are required to be installed on the PCB of the conventional apparatus. This complicates the terminal design and limits its ability to be compact. Third, installation of the LEDs around the buttons degrades the operational sensitivity of the LED actuators.

From the foregoing discussion, it is apparent that there is a need for an improved way of backlighting a keypad of a mobile terminal which does not realize any of the drawbacks of conventional methods.

SUMMARY OF THE INVENTION

It is an object of the present invention to provide an apparatus and method for illuminating an input device of an electronic device which overcomes the drawbacks of conventional illumination methods. The input device may be a single button or keypad, a touch pad, or another input device, and the electronic device may be a mobile communications terminal, a remote control for a television, or any other product having an input device which may require illumination.

It is another object of the present invention to provide a keypad backlighting apparatus within a mobile terminal that illuminates a greater area of the keypad of the mobile terminal compared to conventional methods.

It is another object of the present invention to provide a keypad backlighting apparatus which illuminates the entire keypad of a mobile terminal.

It is another object of the present invention to provide a keypad backlighting apparatus which illuminates an entire keypad of a mobile terminal with the same or substantially similar brightness.

It is another object of the present invention to provide a keypad backlighting apparatus which controls brightness of a backlighted keypad.

It is another object of the present invention to provide a keypad backlighting apparatus which allows a mobile terminal to have a reduced thickness compared with conventional backlighted terminals, by removing parts such as diodes that have been employed for backlighting of conventional keypads.

These and other objects and advantages of the present invention are achieved by providing a keypad backlighting apparatus which, in accordance with one embodiment, includes an upper case having a plurality of button holes formed in a predetermined pattern, an electroluminescence (EL) keypad on a lower surface of the upper case and having buttons exposed through the button holes, a printed circuit board (PCB) installed adjacent the EL keypad and having a backlight driving circuit for supplying power to the EL keypad, and a lower case coupled with the upper case for supporting the EL keypad and the PCB.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF PREFERRED EMBODIMENTS

The present invention is an apparatus and method for illuminating a keypad. The keypad may be one found in a mobile communications terminal, a television remote control, a calculator, or any other electronic device having a button or other type of input device where illumination may be desired. The present invention is also an electronic device equipped with the aforementioned apparatus.

Figure 1:
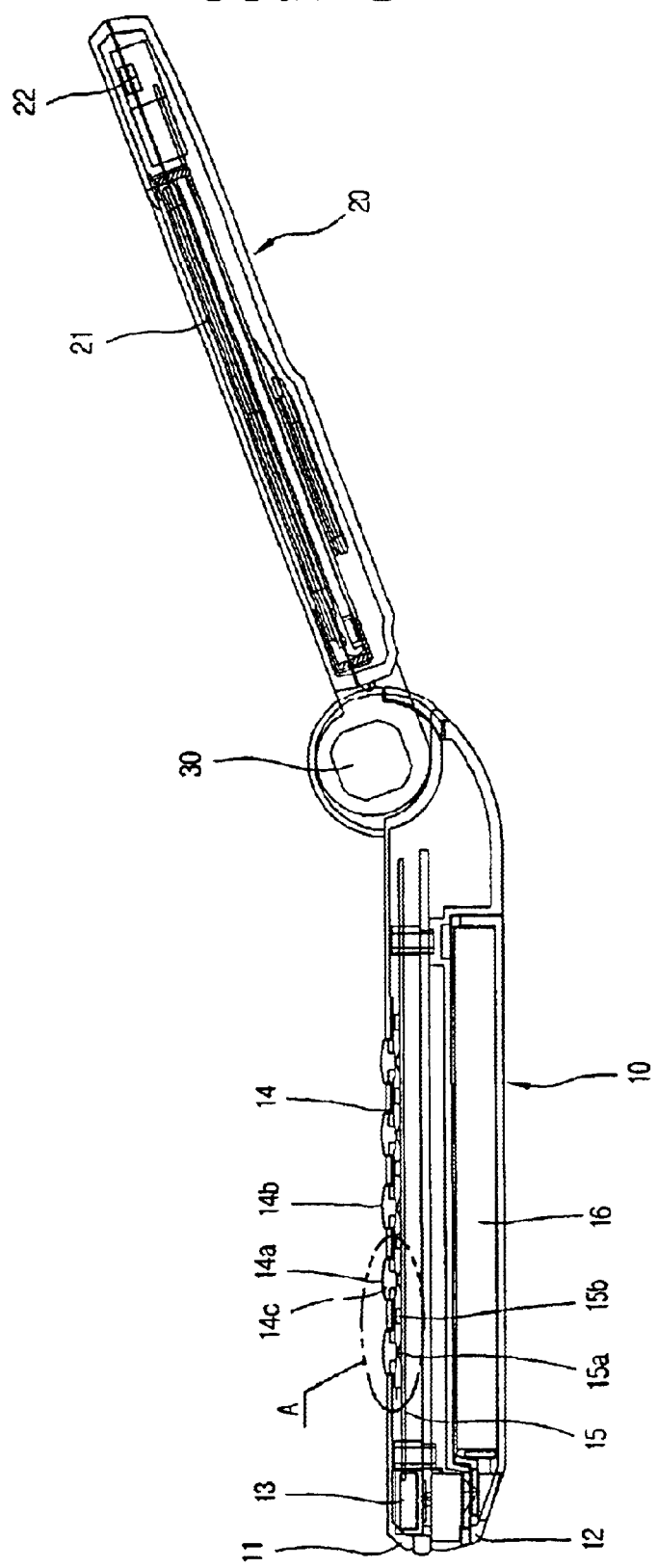
FIG. 1 is a side-sectional view of a mobile terminal employed a conventional backlighting apparatus.
Figure 2:
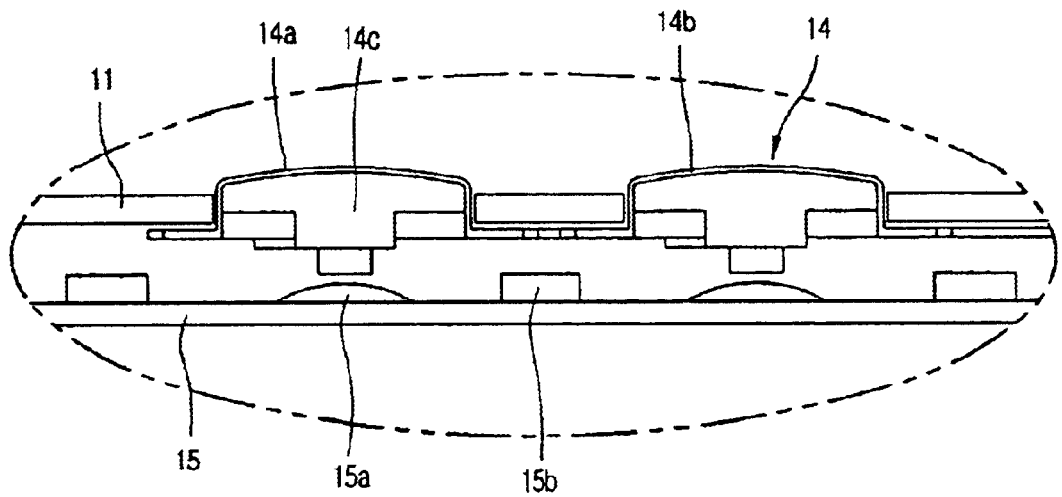
FIG. 2 is an enlarged view of a portion 'A' of FIG. 1.
Figure 3:
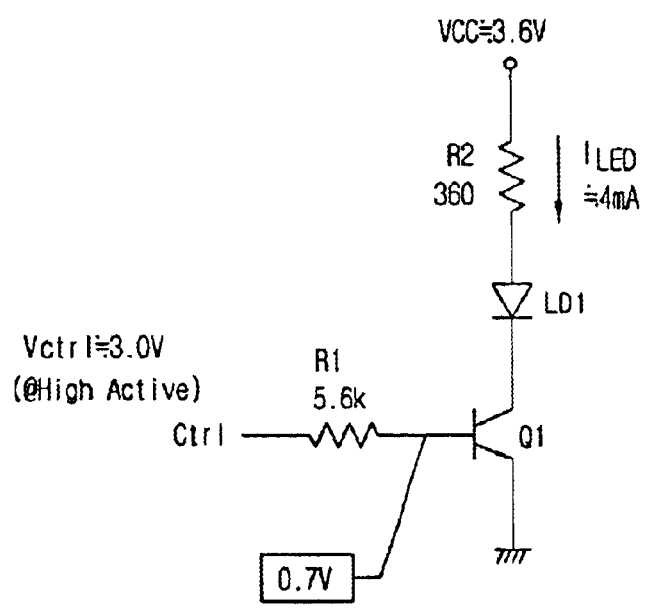
FIG. 3 is a circuit diagram illustrating an LED driving circuit of the mobile terminal of FIG. 1.
Figure 4:
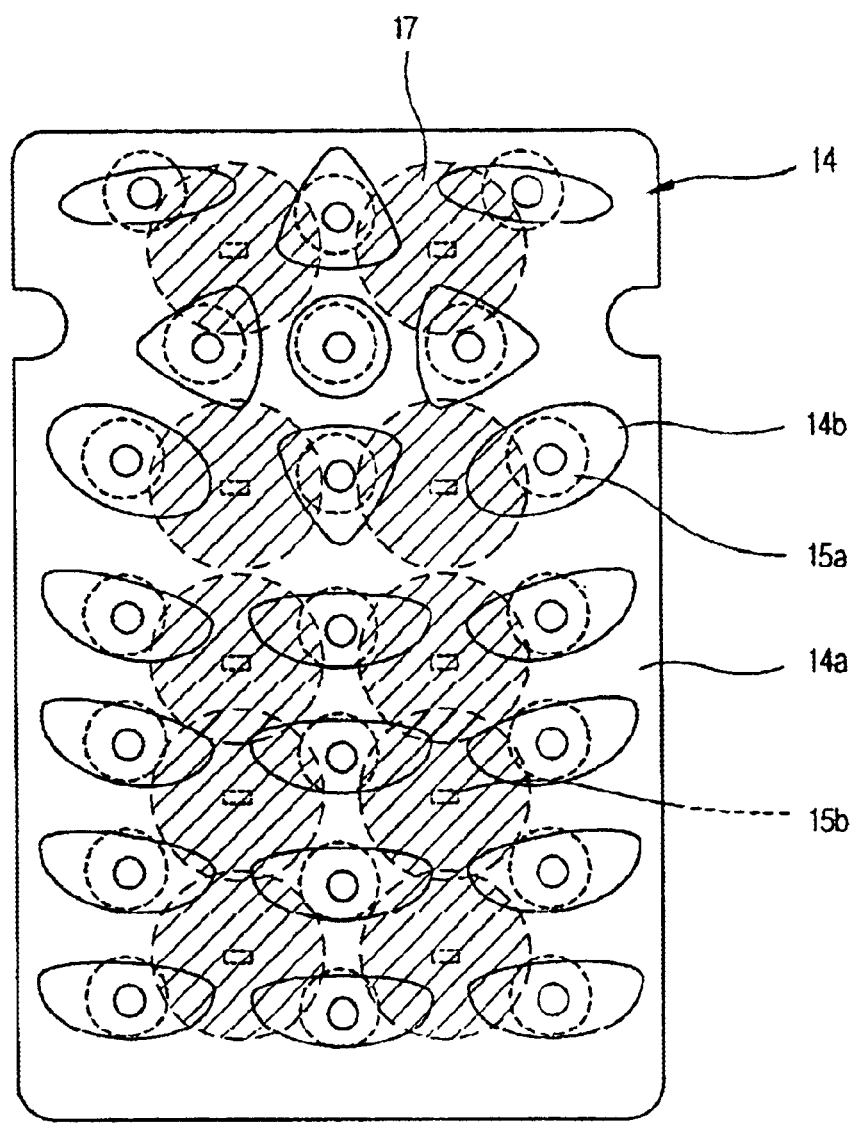
FIG. 4 is a top plan view of a keypad for illustrating illumination coverage of a conventional keypad backlighting apparatus.
Figure 5:
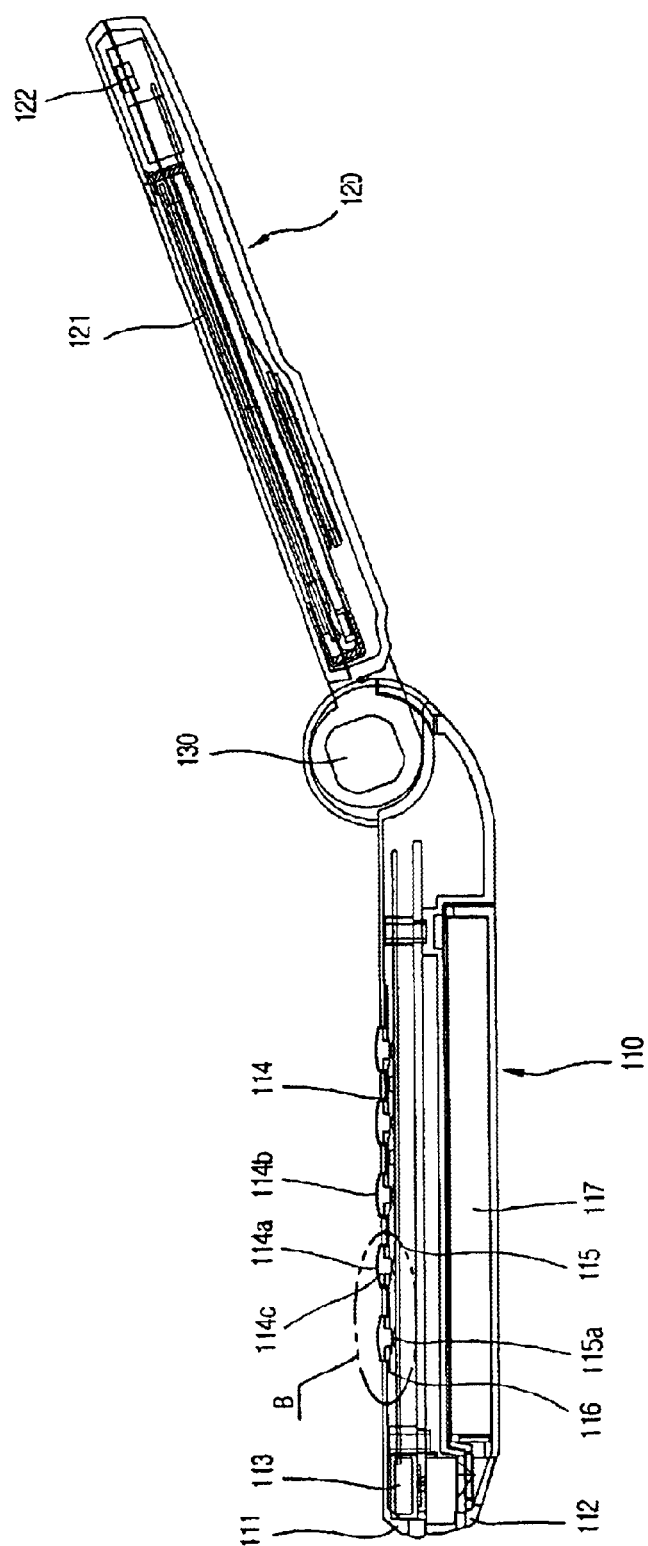
FIG. 5 is a side-sectional view of a mobile terminal employing a keypad backlighting apparatus in accordance with an embodiment of the present invention.

Referring to FIG. 5, a mobile terminal equipped with a keypad backlighting apparatus in accordance with one embodiment of the present invention includes a main body 110 which includes upper and lower cases 111 and 112 for accommodating a keypad 114 and a PCB 115. The terminal also includes a cover 120 having a display unit 121 for displaying an operation state of a mobile terminal and a message and a receiving part 122 for outputting a voice. The cover 120 is connected with the main body 110 by a hinge mechanism 130.

Figure 6A:
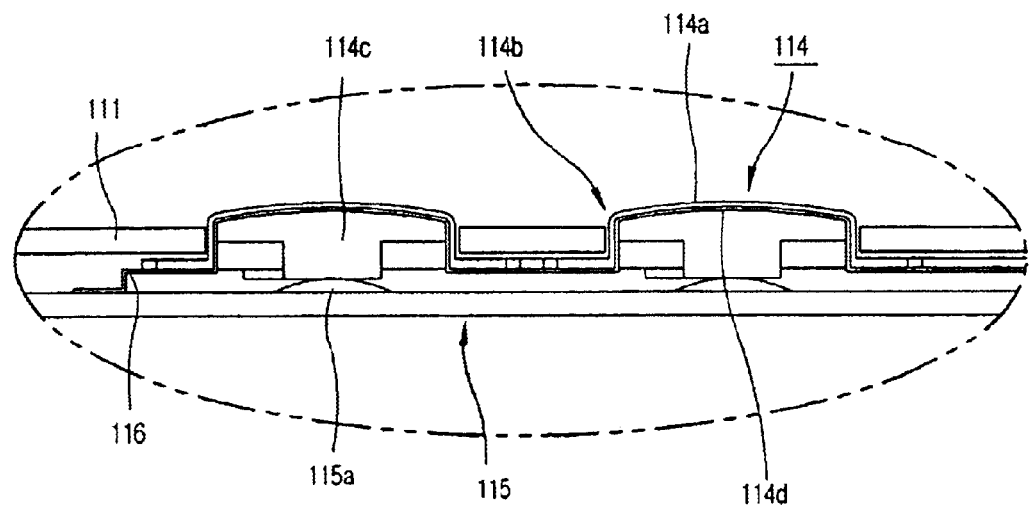
FIG. 6 is an enlarged view of a portion 'B' of FIG. 5.
FIG. 6B shows an enlarged view of the layers comprising a button including an EL layer in accordance with a preferred embodiment of the present invention.

FIG. 6A is an enlarged view of a portion 'B' of the mobile terminal of FIG. 5. This figure shows that the upper case 111 of the main body is provided with a plurality of button holes arranged in a predetermined pattern, and the keypad 114 has a transparent film 114a with a plurality of raised domes 114b corresponding to the button holes of the upper case 111. The upper case also includes button blocks 114c formed by filling silicon in lower cavities of the raised domes 114b such that the domes 114b protrude through corresponding button holes together with the button blocks 114c so as to be exposed outside the upper case 111.

Figure 6B:
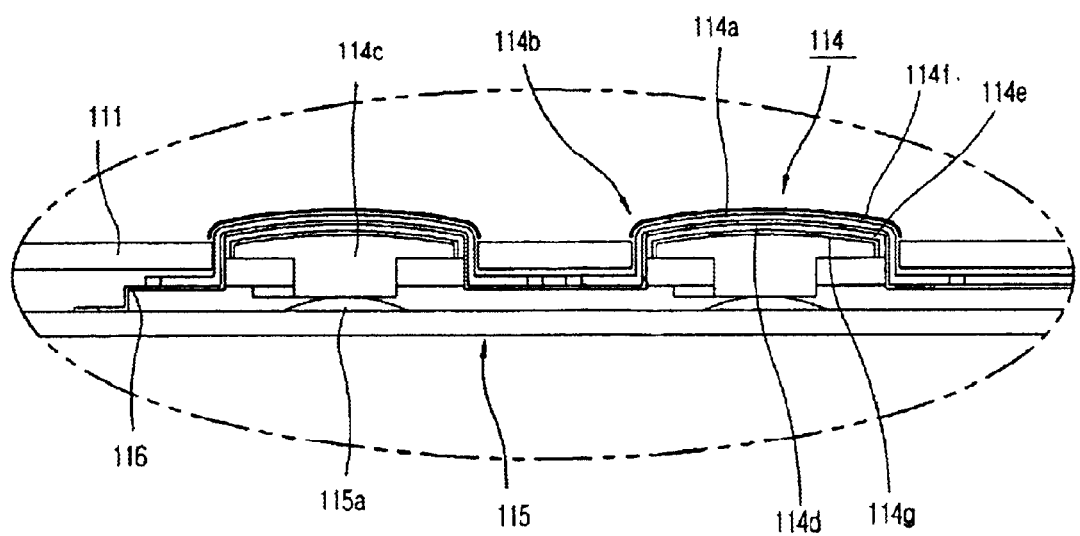

Referring to FIGS. 6A and 6B, the film 114a may include symbols/numbers printed on an upper surface which appear over each dome 114b, and preferably the entire lower surface of the film is coated with electroluminescence (EL) ink so as to form a light emitting layer 114d. If desired, the symbols/numbers may be printed on the surface of each dome 114b or on blocks 114c so that they are visible through film 114a, and if desired less than the entire lower surface of the film may be coated with EL ink. Film 114a also includes a dielectric layer 114e formed on the light emitting layer 114d and a rear electrode formed 114g on the dielectric layer. On the upper surface of the film 114a, an indium tin oxide (ITO) pattern is formed using, for example, a sputtering technique such that the ITO pattern functions as a front electrode 114f.

The PCB 115 is arranged in parallel with the keypad 114 and includes a plurality of actuators 115a contacting the corresponding button blocks 114c of the keypad 114. The PCB also includes a backlight driving circuit (see FIG. 7) for supplying power to the keypad backlighting apparatus. The backlight driving circuit is connected to the light emitting layer 114d of the lower surface of the film 114a through an electrical connector 116.

The lower case 112 is assembled with the upper case 111 so as to support the PCB 115 and has battery-mounting bay in a rear portion thereof for mounting a battery 116.

Figure 7:
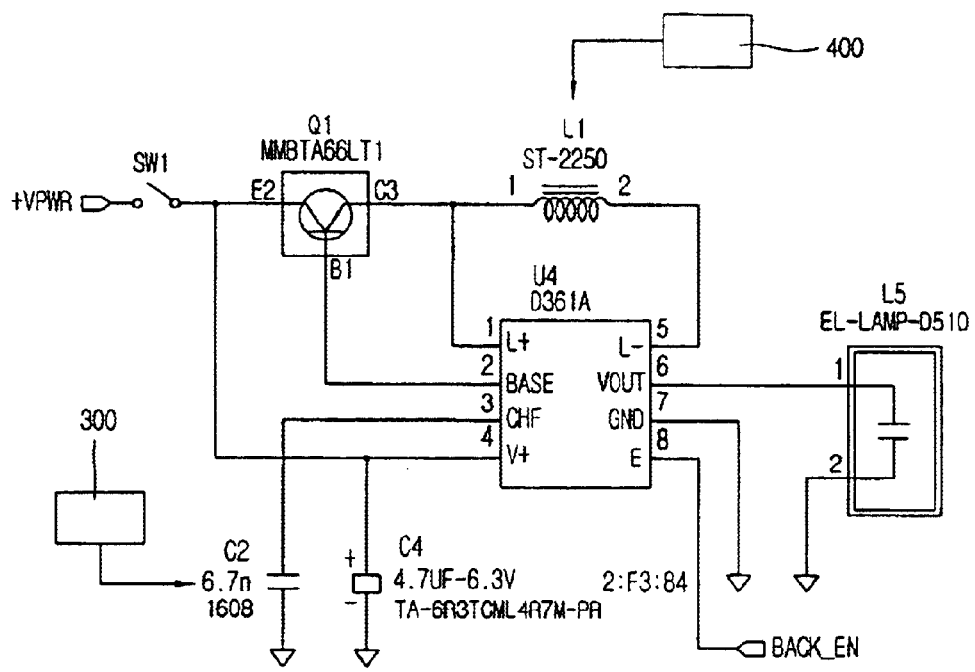
FIG. 7 is a circuit diagram illustrating a driving circuit of a backlighting apparatus in accordance with an embodiment of the present invention.

FIG. 7 is a circuit diagram illustrating a backlight driving circuit in accordance with one embodiment of the present invention. The driving circuit adjusts time constants of a boosting inductor L1 and a capacitor C2, which controls an oscillation frequency. These time constraints are adjusted by applying a DC voltage of, for example, between 3V and 5V, from the battery 116. The DC voltage is converted into an AC voltage of, for example, between 170V and 200V, by an AC converter U4. The AC voltage is then supplied to the light emitting layer 114d of the keypad 114 through the electrical connector 116.

The brightness of the keypad backlighting can be adjusted by controlling the time constants of the boosting inductor L1 and the capacitor C2. To allow for this adjustment, the mobile terminal includes a pair of brightness tuning buttons 300 and 400 preferably mounted outside the main body for adjusting the time constants of the boosting inductor L1 and the capacitor C2. By manipulating these tuning buttons, the brightness of the keypad backlighting is adjusted by controlling a frequency of the AC current to the light emitting layer 114d. A switch for controlling the delivery of power from a power source +VPWR to the EL layer may also be included and controlled, for example, based on detection of the opening and closing of a cover of an electronic device incorporating the keypad.

Figure 8:
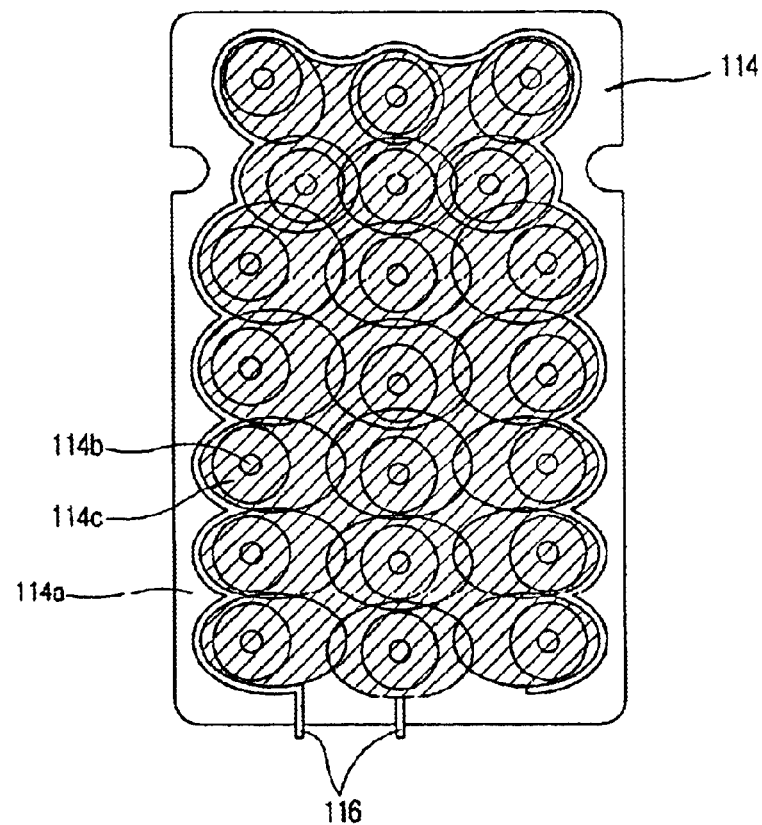
FIG. 8 is a top plan view of a keypad for illustrating an illumination coverage of the keypad backlighting apparatus of the mobile terminal of FIG. 5.

FIG. 8 is a top plan view of a keypad for illustrating illumination coverage of the keypad backlighting apparatus of the mobile terminal of FIG. 5. In the embodiment shown, the entire lower surface of film 114a is coated with the EL ink to ensure that the entire surface of the keypad is evenly illuminated with the same brightness.

Figure 9:
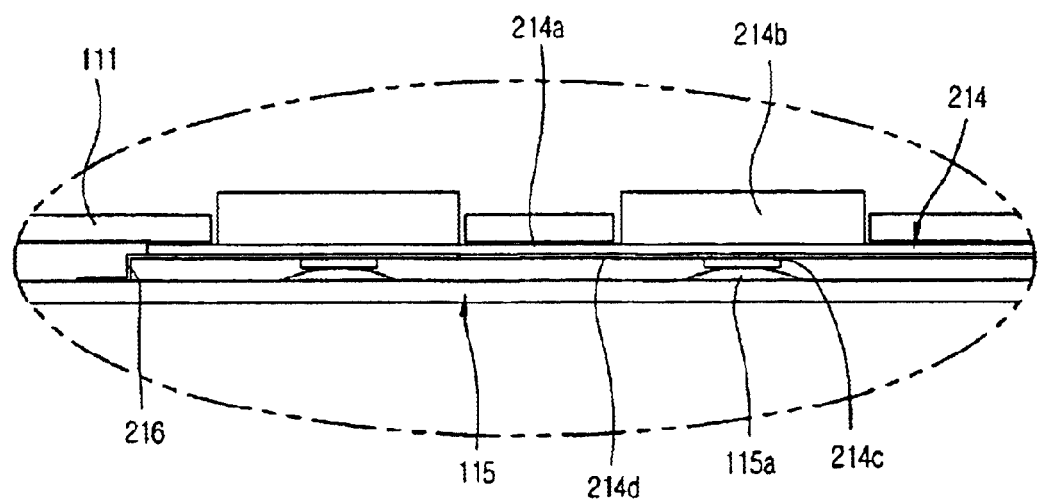
FIG. 9 is an enlarged view of the portion 'B' of FIG. 5 in accordance with another embodiment of the present invention.

FIG. 9 is an enlarged sectional view of the portion 'B' in FIG. 5 in accordance with another embodiment of the present invention. The keypad of this embodiment includes a flat film 214a and a light emitting layer 214d. The flat film has characters and/or numbers printed on an upper surface thereof at positions corresponding to button holes 111a formed on an upper case 111. The light emitting layer is formed by coating a lower surface of the flat film with EL ink. A plurality of transparent silicon buttons 214b are applied at the portion exposed through button holes 111a.

The PCB 115 is arranged in parallel with the keypad and includes a plurality of actuators 115a arranged below the buttons 214b. An electrical connector 216 interconnects the EL layer 214d and the power source for supplying a power to the EL layer.

Operation of the keypad backlighting apparatus of the present invention constructed as above will now be explained.

While the power is on, the backlighting driving circuit operates if the cover of the mobile terminal is opened. Under these conditions, an AC voltage is introduced to the EL layer of the keypad. This causes electrons in the light emitting layer to be excited by an amount proportional to the strength of an electric field generated in the light emitting layer by the AC voltage. Those skilled in the art can appreciate that if the invention is incorporated into a terminal which does not have a cover, the backlight driving circuit may be activated, for example, at power on or in response to an activation button pressed by a user, or even in response to an ambient light detector.

When the excited electrons in the last emitting layer return to a stable state, light is generated from the light emitting layer, and accordingly the entire surface of the keypad where the light emitting layer is formed is evenly illuminated. As a result, the readability of the characters printed on the keypad buttons is improved compared with the conventional technique of using LEDs to produce keypad illumination.

Thus, the keypad backlighting apparatus of the present invention is provided with a lighting emitting layer preferably formed on an entire surface of a film on or adjacent to the keypad. This results in evenly illuminating the entire keypad with the same brightness. Furthermore, the keypad backlighting apparatus may be provided with brightness tuning buttons to allow the brightness of the backlighting to be adjusted, for example, to meet the preferences of a user.

Also, the keypad backlighting apparatus of the present invention does not utilizes LEDs that are used as light source in the conventional backlighting. As a result, it is possible to reduce the thickness of the mobile terminal compared with conventional terminals, and the operation sensitivities of the actuators are also enhanced by removing these LEDs and their associated parts.

In case of adopting the keypad using a flat film like in the second embodiment of the present invention, there is no need to form the domes on the film. This advantageously prevents the EL layer from being damaged due to outside exposure and further the manufacturing process can be simplified.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A keypad backlighting apparatus comprising:
   an upper case having a plurality of button holes formed in a predetermined pattern;
   an electroluminescence (EL) keypad attached to the upper case and having buttons exposed through the button holes;
   a printed circuit board (PCB) adjacent the EL keypad and having a backlight driving circuit for supplying power to the EL keypad; and
   a lower case, coupled to the upper case, for supporting the EL keypad,
   wherein the PCB has a plurality of actuators arranged in a same pattern with the button of the EL keypad such that each actuator contacts a corresponding button,
   wherein the EL keypad comprises:
   a flexible EL pad having a plurality of raised domes protruding through the button holes of the upper case,
   button blocks formed of a predetermined material in lower cavities of the domes, each dome and button block pair defining one button of the EL keypad and wherein the button block contacts a corresponding actuator when depressed,
   a transparent film having a conductive pattern,
   a light emitting layer formed by coating light-emitting ink on a surface of the transparent film,
   a dielectric layer formed on the light emitting layer, and
   a first electrode installed on the dielectric layer.

2. The apparatus of claim 1, wherein the conductive pattern is a second electrode of the flexible EL pad.

3. The apparatus of claim 2, wherein the PCB includes an electrical connector which connects the first and second electrodes to the backlight driving circuit.

4. The apparatus of claim 3, wherein the backlight driving circuit converts an input DC voltage into an AC voltage and applies the AC voltage to the first and second electrodes.

5. The apparatus of claim 4, further comprising:
   a tuner which controls the AC voltage of the backlight driving circuit to adjust a brightness of backlight.

6. The apparatus of claim 4, wherein the input DC voltage is between 3 and 5 volts, and the AC voltage is between 170 and 200 volts.

7. The apparatus of claim 1, wherein the EL keypad comprises:
   a flexible EL pad on which characters or numbers are printed at portions corresponding to the button holes of the upper case; and
   transparent silicon blocks applied on the portions exposed by the button holes such that the characters or numbers are legible through the transparent blocks,
   wherein each transparent block defines one button of the EL keypad.

8. The apparatus of claim 7, wherein the flexible EL pad comprises:
   a transparent film having conductive pattern;
   a light emitting layer on the transparent film;
   a dielectric layer on the light emitting layer; and
   a first electrode on the dielectric layer.

9. The apparatus of claim 8, wherein the conductive pattern is a second electrode of the flexible EL pad.

10. The apparatus of claim 9, wherein the PCB includes a electrical connector which connects the first and second electrodes to the backlight driving circuit.

11. The apparatus of claim 10, wherein the backlighting driving circuit converts an input DC voltage into an AC voltage and applies the AC voltage to the first electrode and the second electrode.

12. The apparatus of claim 11, further comprising:
   a tuner which controls an output of the backlight driving circuit to adjust a brightness of backlight.

13. The apparatus of claim 8, wherein the light emitting layer includes a light emitting ink.

14. The apparatus of claim 7, wherein the conductive pattern on the transparent film includes an indium tin oxide (ITO) layer.

15. The apparatus of claim 1, wherein the conductive pattern on the transparent film includes indium tin oxide (ITO) layer.

16. The apparatus of claim 1, wherein each of the keys includes at least one of printing symbols and numbers which are illuminated by the light emitted from the EL layer.

17. A keypad backlighting apparatus comprising:
   an upper case having a plurality of button holes formed in a predetermined pattern;
   an electroluminescence (EL) keypad attached to the upper case and having buttons exposed through the button holes;
   a printed circuit board (PCB) adjacent the EL keypad and having a backlight driving circuit for supplying power to the EL keypad; and a lower case, coupled with the upper case, for supporting the EL keypad and the PCB, wherein;

the PCB includes a plurality of actuators arranged in a same pattern as the buttons of the EL keypad such that each actuator contacts a corresponding button when depressed.

the EL keypad comprises:

a transparent film having a conductive pattern;

a light emitting layer on the transparent film;

a dielectric layer on the light emitting layer;

an electrode on the dielectric layer, wherein the conductive pattern and the electrode are electrically connected with the backlight driving circuit, and wherein each button has a raised dome protruding through a respective one of the button holes and a button block formed of a predetermined material in a lower cavity of the dome, the button block contacting a respective one of the actuators when the button is depressed.

18. The apparatus of claim 17, wherein the light emitting layer emits light when an AC voltage is applied to the conductive pattern and the electrode.

19. The apparatus of claim 18, further comprising:

a tuner which controls the AC voltage of the backlighting driving circuit to adjust a brightness of backlight.

20. The apparatus of claim 17, wherein the conductive pattern on the transparent film includes an indium tin oxide (ITO) layer.

21. The apparatus of claim 17, wherein each of the keys includes at least one of printing symbols and numbers which are illuminated by the light emitted from the EL layer.

* * * * *